United States Patent [19]
Schneider

[11] 3,974,521
[45] Aug. 10, 1976

[54] CIRCUIT FOR AUTOMATIC GAMMA BALANCING

[75] Inventor: Hans-Dieter Schneider, Gross-Gerau, Germany

[73] Assignee: Robert Bosch G.m.b.H., Stuttgart, Germany

[22] Filed: Sept. 16, 1975

[21] Appl. No.: 613,868

[30] Foreign Application Priority Data
Sept. 28, 1974 Germany............................ 2446539

[52] U.S. Cl.................................... 358/32; 358/10; 178/DIG. 16
[51] Int. Cl.²......................................... H04N 9/53
[58] Field of Search......................... 358/10, 32, 51; 178/DIG. 4, 16

[56] References Cited
UNITED STATES PATENTS
3,272,916   9/1966   James et al. ........................... 358/32
3,752,905   8/1973   Schneider ............................. 358/32
3,919,713   11/1975  Nakamura ............................ 358/32

FOREIGN PATENTS OR APPLICATIONS
4,626,047   6/1971   Japan................................. 358/164

Primary Examiner—Robert L. Griffin
Assistant Examiner—Aristotelis M. Psitos
Attorney, Agent, or Firm—Littlepage, Quaintance, Murphy & Dobyns

[57] ABSTRACT

In gamma balancing several color camera channels, a test signal replaces the normal signal from the pick-up tube and the resulting gamma-corrected signals in the channels are compared. Differences noted in the comparison are used to adjust the gamma correction stages in all but one of the channels.

3 Claims, 1 Drawing Figure

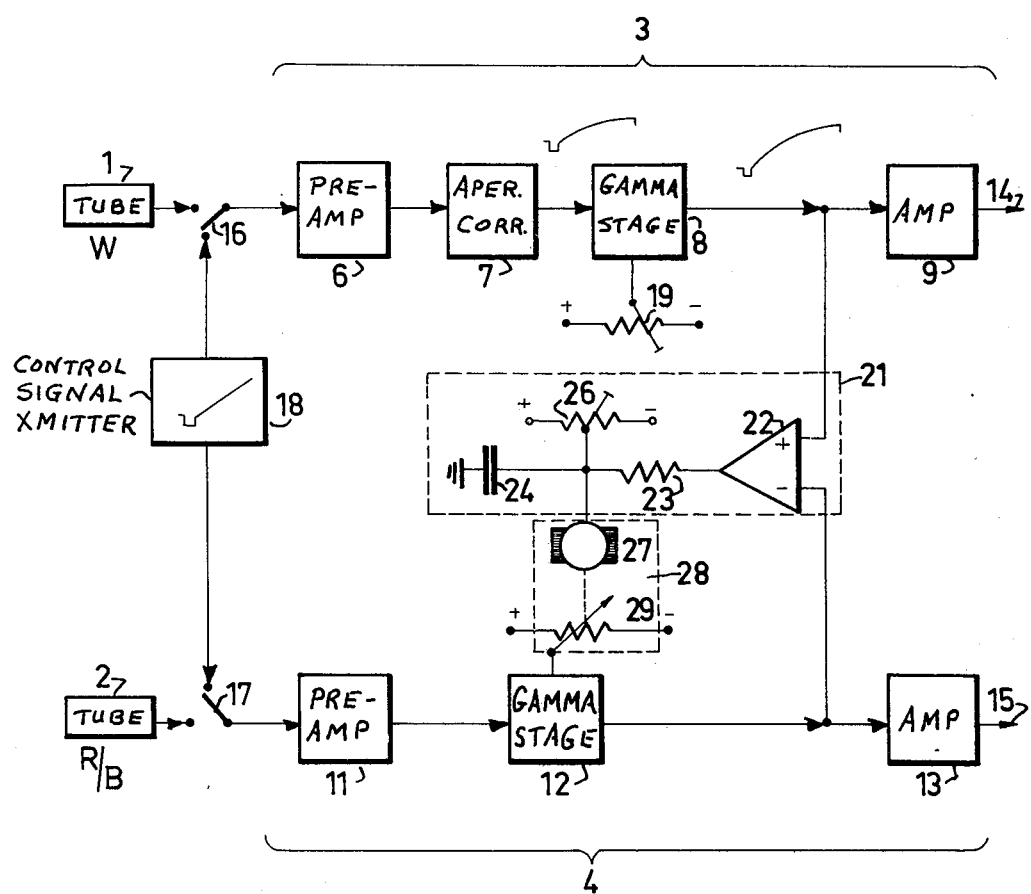

CIRCUIT FOR AUTOMATIC GAMMA BALANCING

BACKGROUND OF THE INVENTION FIELD OF THE INVENTION

The invention relates to a circuit for the automatic gamma balancing of the chromaticity signal channels in a color television camera by means of a control signal.

DESCRIPTION OF THE PRIOR ART

In the course of the automation of color television cameras, it has proved practical to have the balancing of the gamma stages likewise carried out automatically. To facilitate the balancing of the amplifiers provided in the individual channels of a color television camera, an artificial picture signal may be fed to the inputs of the amplifiers from a control signal generator. This permits a balancing of the amplifiers without a picture pattern.

SUMMARY OF THE INVENTION

The invention provides a simple circuit for automatic gamma balancing in a color television camera, which circuit requires no substantial additional expense for circuit elements in comparison with a circuit for manual balancing.

In a circuit according to the invention, instead of the pick-up tubes of the camera, a control signal transmitter is connected to the channels of the camera. Furthermore, the output of the gamma stage of the luminance signal channel is connected to the first input, and the outputs of the gamma stage of each chromaticity signal channel are connected to the second input of respective comparator stages (one in each case). The outputs of the comparator stages are connected to the gamma regulator of the respective gamma stage in the corresponding chromaticity signal channel.

The invention has the advantage that the gamma balancing takes place automatically without requiring additional measuring instruments or special professional knowledge of the operating personnel.

BRIEF DESCRIPTION OF THE DRAWING

The invention will now be explained in greater detail with the aid of an embodiment presented by way of example in the sole FIGURE, wherein only the elements necessary for the understanding of the invention are shown.

DESCRIPTION OF THE PREFERRED EMBODIMENT

The block diagram shown in the FIGURE is a portion of a color television camera with a pick-up tube 1 for the generation of the luminance signal and one or more pick-up tubes 2 for the generation of the chromaticity signal or signals. The signal generated by means of tube 1 is fed to the luminance signal channel 3, and the signal generated by means of tube(s) 2 is fed to the chromaticity signal channel 4. Channel 3 consists essentially of a preamplifier 6, an aperture corrector 7, a gamma stage 8, and an amplifier 9. Channel 4 comprises a preamplifier 11, a gamma stage 12, and an amplifier 13. At the output 14 of channel 3 and at the output 15 of channel 4, the gamma-corrected luminance and chromaticity signals can respectively be tapped and then be fed to a flowing matrix (not shown in the FIGURE).

For the purpose of gamma balancing, instead of connecting pick-up tubes 1 and 2, it is possible to connect a control signal transmitter 18 via switches 16 and 17 to transmit to channels 3 and 4 a control signal, for example, a signal of sawtooth shape. By means of an adjustable gain resistor 19 in the reference gamma stage 8, the gamma correction for the luminance signal is balanced in a one-time operation (factory balance). For the automatic gamma balancing of the chromaticity signals, a comparator stage 21 is provided which consists of a differential amplifier 22, a resistor 23, a capacitor 24 and an adjustable resistor 26. The first input of this comparator stage 21 is connected to the output of gamma stage 8, and the second input to the output of gamma stage 12. Thus a signal voltage derived in each case from the luminance signal and from a chromaticity signal is fed to the two inputs of differential amplifier 22. When the signals applied to the inputs differ, a d.c. error voltage corresponding to the magnitude and direction of this difference can be tapped at the output of differential amplifier 22, which d. c. voltage is fed to the motor 27 of a motor potentiometer 28. Motor 27 then adjusts the collector ring of gain potentiometer 29 until the signal voltages at the inputs of comparator stage 21 are equal. Thereafter the gamma curves of the chromaticity signals agree with that of the luminance signal. The comparator stage may be disabled when switches 16 and 17 are connected to the pick-up tubes.

Since additional circuits in one of signal channels 3 and 4, such as aperture corrector 7 in channel 3, may cause a transit and/or level difference with respect to the other channel to occur, an adjustable resistor 26 is provided in comparator stage 21. This resistor should, before the start of the automatic gamma balancing be adjusted in such a way that possible existing transit and/or level differences have been reduced to zero, since otherwise a faultily corrected signal may occur in the subsequent gamma balancing.

The device could be expanded to include other channels similar to channel 4 by providing a comparator stage to compare each such channel to channel 3 and by providing another signal connection from transmitter 18.

What is claimed is:

1. In a color television camera having a pick-up tube for a white signal and at least one pick-up tube for a color signal, the white signal being applied in operation to a first channel including a first gamma correction stage and the at least one color signal being applied in operation to at least one second channel including a second gamma correction stage, the improvement comprising a circuit for automatically balancing the gamma correction in the first and second channels comprising:

A. a control signal transmitter for generating an artificial picture test signal, B. switch means operable while balancing the first and second channels for removing the pick-up tube signals from the first and second channels and for inserting the test signal in the first and second channels, the switch means operating at other times to insert the pick-up tube signals into their proper channels, C. comparator means operable while balancing the first and second channels for comparing output signals from the first and second gamma correction stages to derive an error signal, and D. means responsive to the error signal to adjust a gamma regulator in the second gamma correction stage to reduce the error signal, whereby the gamma correction in the two channels is automatically balanced.

2. Device according to claim 1, wherein the gamma regulator of the second gamma correction stage is a motor potentiometer comprising a motor connected to the output of the comparator means.

3. Device according to claim 1, wherein, for balancing transit and/or level differences in the individual signal channels to be compared, a correcting signal is added to the output signal of the comparator means.

* * * * *